Sept. 7, 1926.

E. WILSON

SHREDDING MACHINE

Filed Jan. 26, 1926

1,598,999

3 Sheets-Sheet 1

Inventor:
Edmund Wilson.
by Calver & Calver
attys

Sept. 7, 1926.

E. WILSON

SHREDDING MACHINE

Filed Jan. 26, 1926

3 Sheets-Sheet 2

1,598,999

Inventor:
Edmund Wilson.
by Calver & Calver.
attys

Sept. 7, 1926.
E. WILSON
1,598,999
SHREDDING MACHINE
Filed Jan. 26, 1926      3 Sheets-Sheet 3
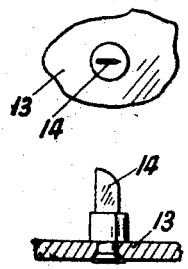
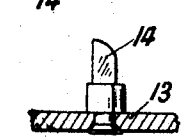
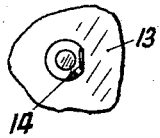
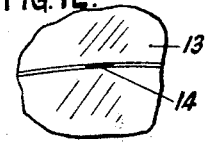
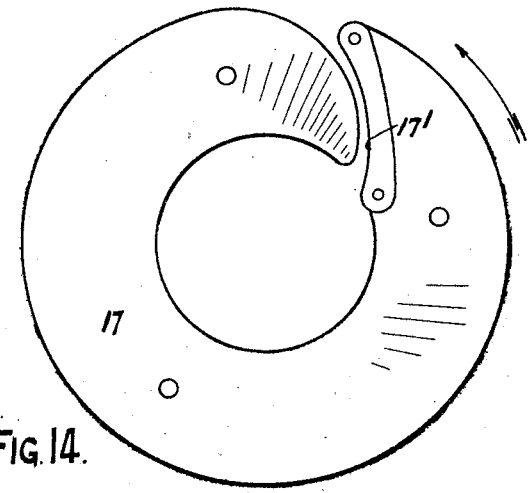
Inventor:
Edmund Wilson.
by Calver & Calver
attys Patented Sept. 7, 1926.

1,598,999

UNITED STATES PATENT OFFICE.

EDMUND WILSON, OF GLASGOW, SCOTLAND.

SHREDDING MACHINE.

Application filed January 26, 1926, Serial No. 83,840, and in Great Britain January 30, 1925.

This invention relates to vegetable shredding machines.

Figure 1:
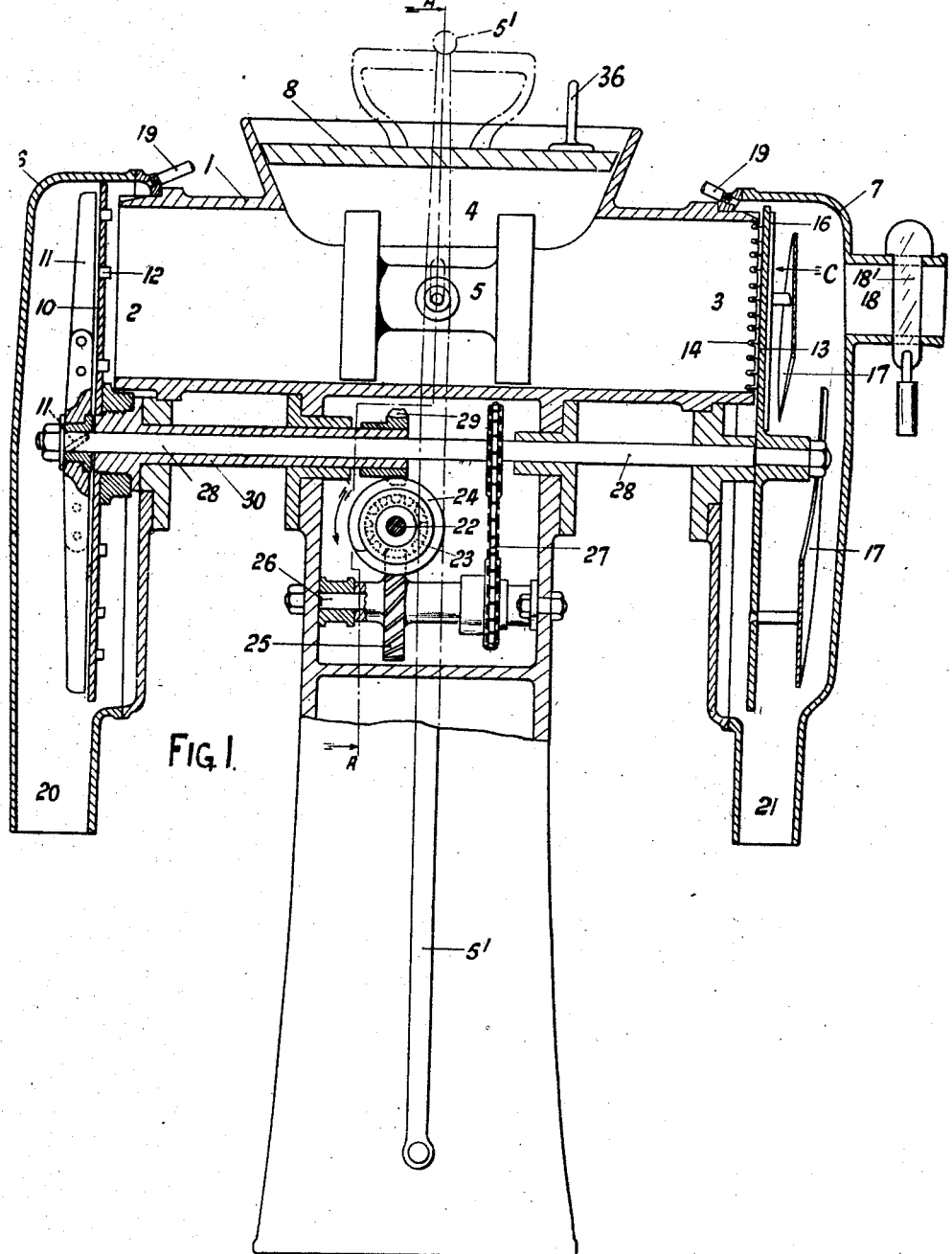
Figure 2:
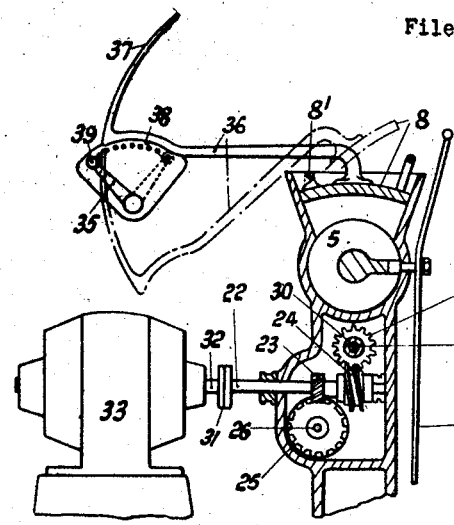
Figure 6:
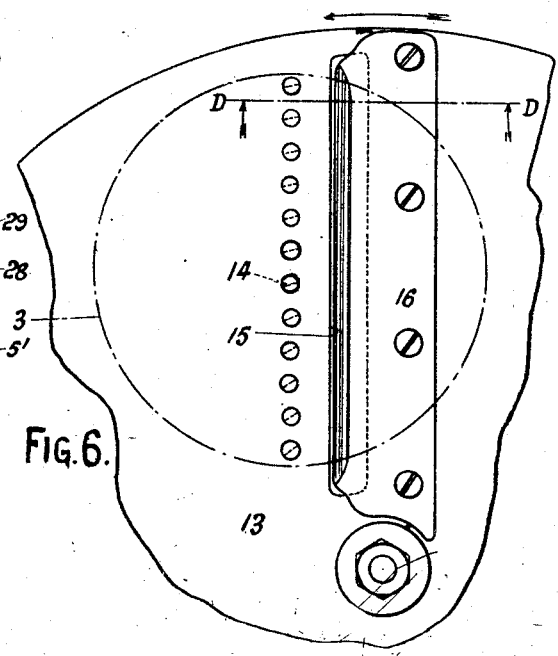
Figure 3:
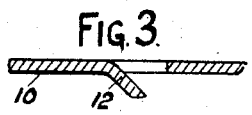
Figure 7:
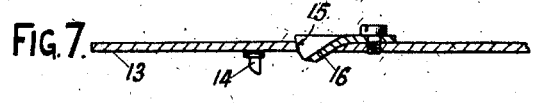
Figure 4:
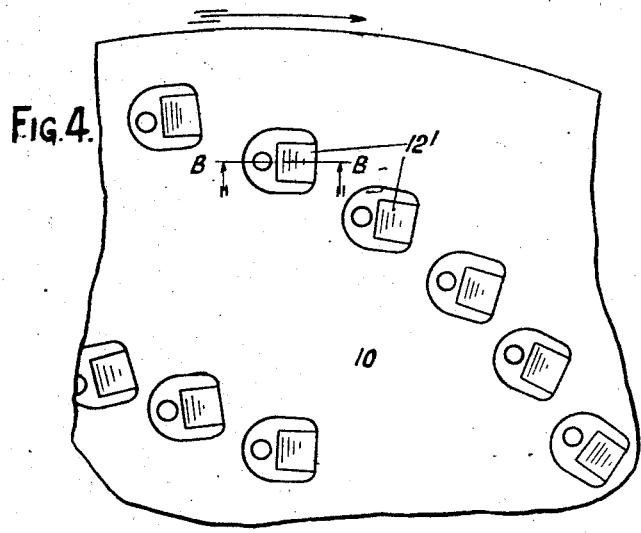
Figure 5:
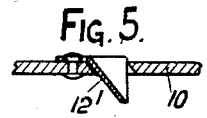

In the accompanying drawings, Fig. 1 is a part elevation part section of a vegetable shredding machine according to the invention; Fig. 2 is a fragmentary section on the line A—A of Fig. 1; Fig. 3 is a fragmentary section drawn to a larger scale of a gouge struck from a cutting disc; Fig. 4 is a fragmentary view drawn to the larger scale showing a modified form of cutting disc; Fig. 5 is a section on the line B—B of Fig. 4; Fig. 6 is a detail view drawn to the larger scale and looking in the direction of the arrow C of Fig. 1; Fig. 7 is a section on the line D—D of Fig. 6; Figs. 8 and 9, Figs. 10 and 11 and Figs. 12 and 13 are elevations and corresponding sections, drawn to a still larger scale, of different constructions of scoring knives; Fig. 14 is a detail view of a helical rotary cutter.

The shredding machine shown comprises a hollow cylinder 1 having open ends constituting discharge orifices 2, 3 and an opening 4 between the ends constituting an inlet orifice for vegetables or the like. A manually operable ram 5 is reciprocable by means of a lever 5′ in the cylinder 1 so as to force vegetables or the like fed through the orifice 4 towards one or other of the orifices 2, 3 according to the direction of movement of the ram 5.

Vegetable cutting means hereinafter described are arranged in operative relationship with the orifices 2, 3 and are housed in casings 6 and 7 enclosing, respectively, the orifices 2 and 3. A cover 8 fitting the inlet orifice 4 is hingedly mounted at 8′ on the cylinder 1 and is adapted to swing clear of the said orifice 4 to permit access to the interior of the cylinder 1.

The vegetable cutting means located in operative relationship with the discharge orifice 2, which is intended to discharge turnips, carrots or the like, comprises a rotary perforated disc 10 having adjacent to the perforations gouges which serve to shred the vegetables fed by the ram 5 towards the disc 10, and a rotary cutter 11 disposed in the line of feed beyond the disc 10 and arranged to rotate differentially of the disc.

A preferred form of cutting disc 10 is formed with gouges 12 struck from the material of the disc whereby to form through-perforations adjacent to the cutting edges. A modified form of gouge comprises a gouge proper 12′ inserted into a perforation and riveted to the disc 10 (see Figs. 4 and 5).

Located in operative relationship with the discharge orifice 3, which is intended to discharge cabbage or the like, is a rotary disc 13 which carries a row of cutters 14 disposed adjacent to a substantially radial slot 15 (see Figs. 6 and 7), in which is arranged a gouge 16, the cutters 14 serving to score the cabbage or the like and the gouge 16 serving to chop the cabbage or the like. The cutters 14 may be formed for attachment to the disc 13 as shown in Figs. 8 and 9, Figs. 10 and 11, or Figs. 12 and 13.

Located in the casing 7 and secured to the disc 13 is a helical rotary cutter 17 towards which is fed rhubarb or the like through a lateral opening 18 in the casing 7, the axis of the opening 18 intersecting the path of the cutting edge 17′ of the cutter 17. 18′ denotes a bar which prevents the entry of the operator's hands into the casing 7.

Nozzles 19 penetrating perforations in the casings 6 and 7 are adapted to direct on to the rotary discs 10 and 13 jets of preferably hot water serving to remove shredded vegetable from the gouges and the cutters and to entrain the vegetable matter through the final discharge orifices 20 and 21.

The means for driving the discs and the cutters comprises a rotary driving shaft 22 carrying a skew gear wheel 23 and a worm 24. The wheel 23 meshes with a skew gear wheel 25 on a counter shaft 26 which drives at high speed, through the intermediary of chain-and-sprocket gearing 27, a shaft 28 at the ends of which are mounted the cutter 11 and the disc 13. The worm 24 meshes with a worm-wheel 29 on one end of a tubular slow-speed shaft 30 partly sleeving the shaft 28 and carrying at its other end the disc 10. The cutter 17 rotates with the disc 13.

The driving shaft 22 is coupled at 31 to the rotor shaft 32 of an electric motor 33 which is controlled by a rheostat 34 having a control arm 35. Rigidly mounted on the cover 8 so as to participate in the swinging movements thereof is an arm 36 provided with an arcuate face 37 which is concentric with the hinge 8′ and an arcuate face 38 which is concentric with the circular path described by an operating handle 39 fitted to the arm 35.

The rheostat presents control gear regulating the movement of the driver for the cutting means which is constituted by the electric motor 33, and the arm 36 constitutes interfering means so interposed between the cover 8 and the arm 35 of the rheostat as to lock the cover against opening movement so long as the driver is operative.

It will be seen that, when the arm 35 is in the inoperative position shown, the cover 8 is free to open and, when the cover 8 is closed, the arm 35 is free to move clockwise into the operative position indicated by the dotted lines. When, however, the arm 35 is in operative position, movement of the arm 36 is arrested by the handle 39 which now abuts against the face 38. Similarly, when the cover 8 is in the open position indicated by the dotted lines, movement of the handle 39 is arrested by the arm 36 of which the face 37 now abuts against the handle 39.

I claim:—

1. A shredding machine comprising a hollow cylinder having open ends constituting discharge orifices and a lateral opening between the ends constituting an inlet orifice, a ram manually reciprocable axially of said cylinder to force material admitted through said inlet orifice towards one or other of said discharge orifices according to the direction of movement of said ram, cutting means arranged in operative relationship with said discharge orifices, a driver for actuating said cutting means, control gear for regulating said driver, casings enclosing said discharge orifices, a cover normally closing said inlet orifice, and interfering means interposed between said control gear and said cover to lock said cover against opening movement so long as the driver is operative, and to maintain said driver inoperative so long as said cover is open.

2. A shredding machine comprising a hollow cylinder having at least one discharge orifice and an inlet orifice, a ram manually reciprocable axially of said cylinder to force material admitted through said inlet orifice towards said discharge orifice, and cutting means arranged in operative relationship with said discharge orifice, said cutting means including a rotary disc formed with perforations and having gouges opposite said perforations which serve to shred material fed by said ram towards said disc and a cutter disposed in the line of feed beyond said disc and rotatable differentially of said disc.

In testimony whereof I have signed my name to this specification.

EDMUND WILSON.